UNITED STATES PATENT OFFICE.

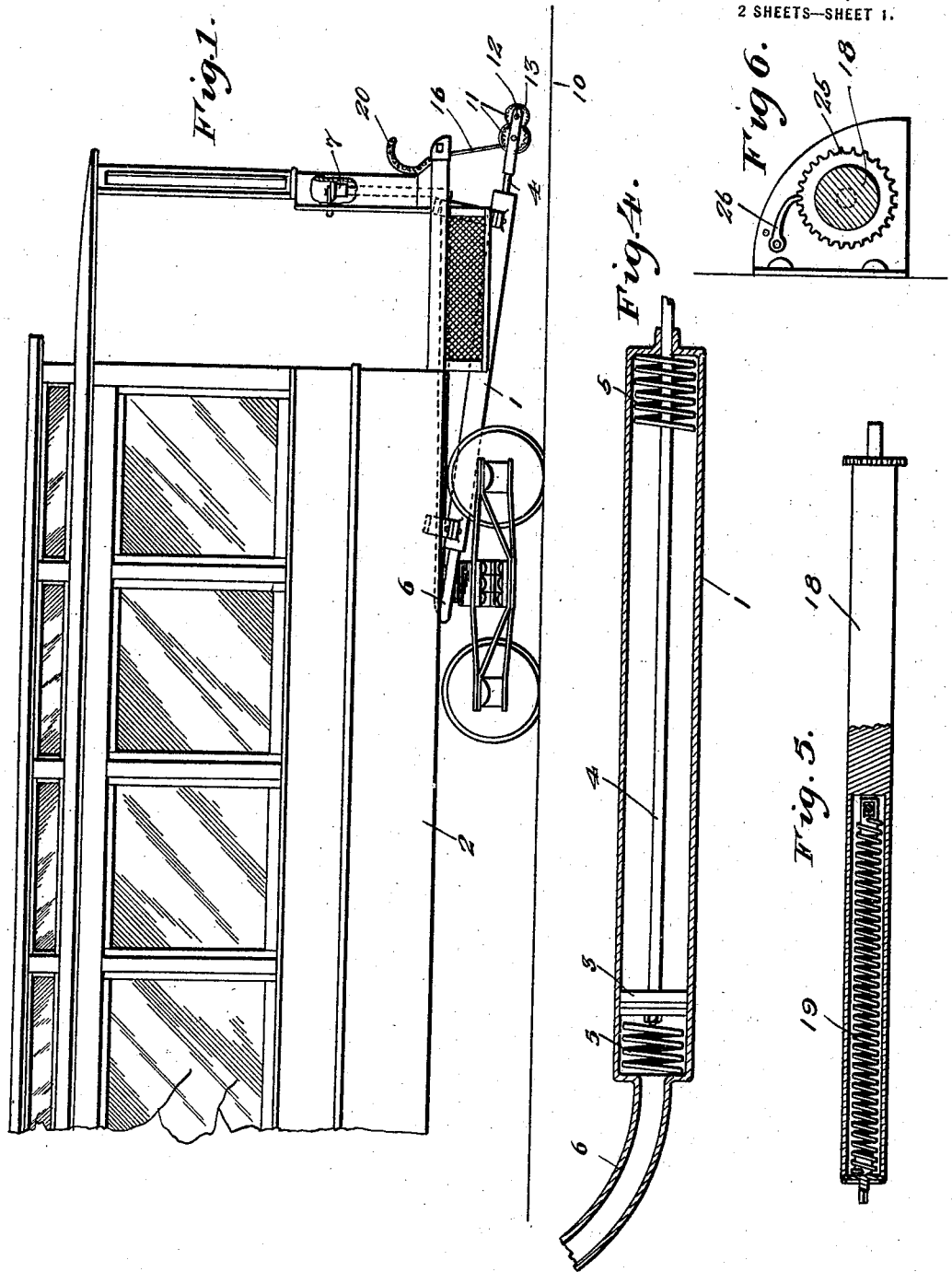

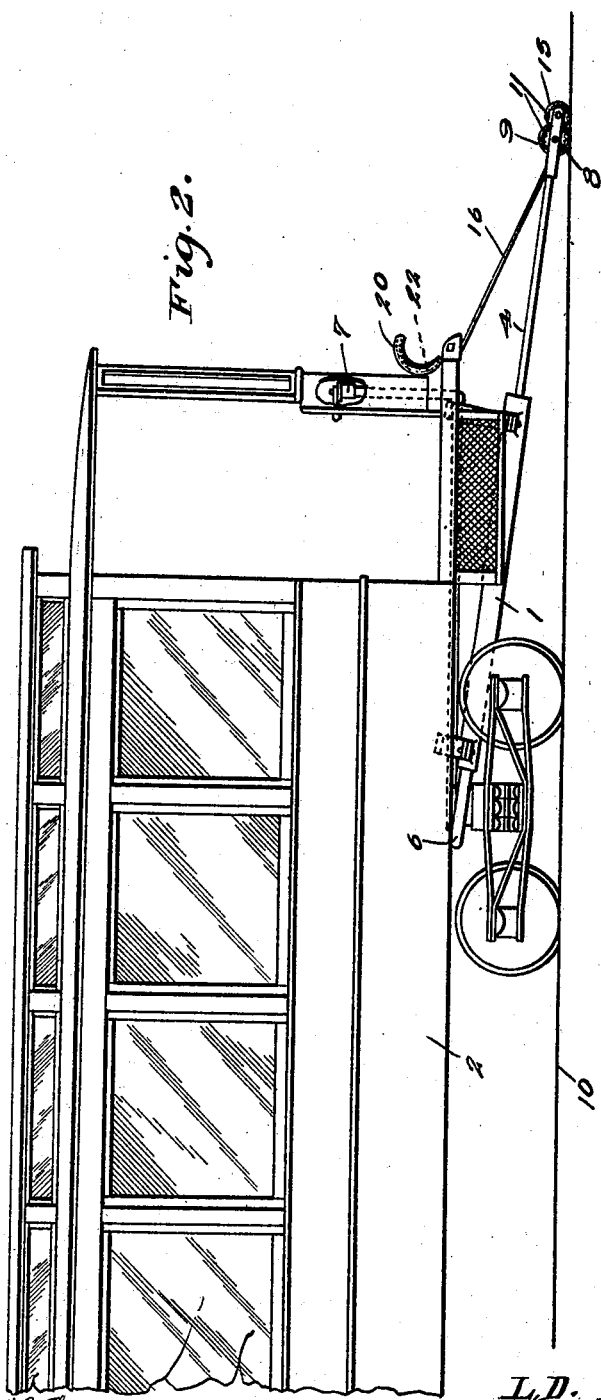

LOUIS DAVIS HAMILTON, OF TITUSVILLE, FLORIDA, ASSIGNOR OF ONE-HALF TO THOMAS A. CONWAY, OF TITUSVILLE, FLORIDA.

CAR-FENDER.

1,400,057.  Specification of Letters Patent. Patented Dec. 13, 1921.

Application filed March 12, 1921. Serial No. 451,719.

*To all whom it may concern:*

Be it known that I, LOUIS DAVIS HAMILTON, a citizen of the United States, residing at Titusville, in the county of Brevard and State of Florida, have invented new and useful Improvements in Car-Fenders, of which the following is a specification.

The object of my present invention is the provision of a simple, inexpensive and efficient fender for street cars and other vehicles, and one which will perform the desired function of picking up a person in the path of a car or other vehicle without injuring such person.

To the attainment of the foregoing, the invention consists in the improvement as hereinafter described and definitely claimed.

In the accompanying drawings, forming part hereof:—

Figure 1 is a side elevation showing my novel fender in normal position.

Fig. 2 is a similar view showing the fender as extended and ready for use.

Fig. 3 is a plan view illustrative of the extended fender.

Fig. 4 is a longitudinal vertical section through one of the cylinders.

Fig. 5 is an enlarged view of the roller 18.

Figs. 6 and 7 are views of details hereinafter explicitly referred to.

Similar numerals of reference designate corresponding parts in all of the views of the drawings.

In furtherance of my invention two cylinders 1 are fixed in inclined position at the underside of the body 2 of a car or other vehicle. Movable in said cylinders are pistons 3 the rods 4 of which are designed to be extended forwardly from the cylinders as illustrated in Fig. 2. In the opposite end portions of the cylinders 1 are cushioning springs 5, designed and adapted to absorb shock and jar as the pistons 3 approach the ends of the cylinders. A conduit 6 is connected with the rear ends of the cylinders 1 and is designed to be connected with a suitable source of fluid pressure supply. At a point within convenient reach of the motorman the said conduit 6 is provided with a valve 7 adapted in one position to establish connection between the source of fluid pressure supply and the cylinders and in another position to establish connection between the cylinders and the atmosphere. The cylinders 1 are appropriately braced and held in parallelism with each other, and the forward ends of the piston rods 4 are constructed and arranged to carry an axle 8 on which are flanged wheels 9. When the piston rods 4 are extended by the admission of fluid under pressure to the cylinders 1, the said wheels 9 are adapted to engage and travel on the railway rails indicated by 10. From this it follows that when the piston rods 4 are extended into working position the axle 8 will be positively rotated about its axis. The said axle 8 is connected through spur gearing 11 with a shaft 12 in parallelism with the said axle 8, and the said shaft 12 is provided with a corrugated roller 13, of rubber or other yielding material. The said roller 13 is disposed immediately in front of the axle 8 and is so relatively arranged that when the wheels 9 are rotated by contact with the rails 10, the roller will be turned upwardly and rearwardly with the result that the roller will have the capacity of picking up small objects.

Fastened at one end to a transverse bar 15 and arranged immediately in rear of the roller 13 is a flexible support 16 of appropriate textile material or of any other material consonant with its purpose. At its rear end the flexible support 16 is connected with a roller 18, Figs. 5 and 6 mounted at the forward end of the car body 2. In the said roller 18 is a spring 19 which is so constructed and arranged that it will be put under tension by forward movement of the support 16, and consequently will operate when the support 16 is released to rotate the roller 18 in reverse direction and thereby take up the flexible support 16 on the roller. This operation takes place in concert with the exhausting of the fluid under pressure from the cylinders 1.

The flexible support 16 will manifestly serve to receive and carry the body of a person caught on my novel fender, and this without injury to such person.

In order to prevent injury to a person caught in the fender when the car is traveling at a high rate of speed I provide the guard 20 which is arranged in front of the car body 2 and is in the form of a strip 21 of appropriate textile material carried by two curved steel rods 22, the said rods 22 having their upper portions directed away from the forward end of the car body 2 as illustrated.

In order to lock the support 16 and the piston rods 4 against casual movement from their working position I prefer to provide the roller 18 with a ratchet 25, Fig. 6, and I also prefer to employ a gravitational pawl 26 for coöperation with said ratchet. This, however, is not of the essence of my invention, and hence it follows that the ratchet 25 and pawl 26 may when deemed expedient be altogether omitted without affecting my invention as claimed.

In the practical operation of my novel fender it is simply necessary when the motorman observes an object on the track for the motorman to manipulate the valve 7 and thereby let fluid under pressure into the cylinders 1. This operation on the part of the motorman will bring about the extension of the piston rods 4 and the flexible support 16, whereupon the wheels 9 will travel on and be turned by the track rails 10. Then when the object on the track is encountered the said object will be taken up by the roller 13 and will be received and carried on the support 16.

After an operation of the fender it is simply necessary for the motorman to manipulate the valve 7 so as to exhaust fluid under pressure from the cylinders 1 when the roller 18 will be rotated in reverse direction and incident to such rotation will take up the flexible support 16 and retract the pistons and piston rods in the cylinders 1.

Having described my invention, what I claim and desire to secure by Letters-Patent, is:—

1. The combination of a vehicle body, longitudinal cylinders carried in forwardly and downwardly inclined position at the underside of said body, pistons movable in the cylinders and having rods extended forwardly through the forward ends of the cylinders, manually-controlled means to supply fluid under pressure to and exhaust fluid under pressure from the rear portions of the cylinders, an axle journaled in the forward portions of the piston rods and having flanged wheels to travel on track rails, a corrugated roller of elastic material connected by gearing with the said axle and arranged in advance of the axle and in a plane below that of the axle, a roller mounted at the forward end of the vehicle body, a spring housed in said roller and adapted to be placed under tension by turning of the roller in one direction and to rotate the roller in the opposite direction, and a flexible support connected with the forward portions of the piston rods and the roller on the body and adapted to be drawn from and taken up on said roller.

2. The combination of a vehicle body, longitudinal cylinders carried in forwardly and downwardly inclined position at the underside of said body, pistons movable in the cylinders and having rods extended forwardly through the forward ends of the cylinders, manually-controlled means to supply fluid under pressure to and exhaust fluid under pressure from the rear portions of the cylinders, an axle journaled in the forward portions of the piston rods and having flanged wheels to travel on track rails, a corrugated roller of elastic material connected by gearing with the said axle and arranged in advance of the axle and in a plane below that of the axle, a roller at the forward end of the body, a spring housed in said roller and adapted to be placed under tension by turning of the roller in one direction and to rotate the roller in the opposite direction, a flexible support connected with the forward portions of the piston rods and the roller on the body and adapted to be drawn from and taken up on said roller, and a guard carried at the forward end of the body and overhanging the said roller.

In testimony whereof I affix my signature.

LOUIS DAVIS HAMILTON.